US011308452B2

(12) United States Patent
Benz et al.

(10) Patent No.: US 11,308,452 B2
(45) Date of Patent: Apr. 19, 2022

(54) USER INTERFACE FOR TIME ENTRY

(71) Applicant: INTUIT INC., Mountain View, CA (US)

(72) Inventors: Jennifer Bantrell Benz, Star, ID (US); Shawn Murdock, Star, ID (US); Mark Robert Vachon, Boise, ID (US); Timothy Morgan, Boise, ID (US)

(73) Assignee: INTUIT, INC., Mountain View, CA (US)

( * ) Notice: Subject to any disclaimer, the term of this patent is extended or adjusted under 35 U.S.C. 154(b) by 19 days.

(21) Appl. No.: 16/826,732

(22) Filed: Mar. 23, 2020

(65) Prior Publication Data
US 2021/0295271 A1    Sep. 23, 2021

(51) Int. Cl.
G06Q 10/10    (2012.01)
G06F 3/0482    (2013.01)
G06F 3/0484    (2013.01)
G06F 3/04847    (2022.01)

(52) U.S. Cl.
CPC ....... G06Q 10/1091 (2013.01); G06F 3/0482 (2013.01); G06F 3/04847 (2013.01)

(58) Field of Classification Search
CPC ......... G06Q 10/1091; G06Q 10/06311; G06Q 10/063116; G06Q 10/06314; G06Q 10/109; G06Q 10/1093; G06Q 10/1095; G06Q 10/1097; G06F 3/0482; G06F 3/04847; G06F 15/0266; G07C 1/00; G07C 1/04; G07C 1/06; G07C 1/08; G07C 1/10; G07C 1/12; G07C 1/14; G07C 1/16; G07C 1/18; G07C 1/20
See application file for complete search history.

(56) References Cited

U.S. PATENT DOCUMENTS

| 8,055,556 | B2 * | 11/2011 | Taylor | G06Q 10/109 |
| | | | | 705/30 |
| 9,864,483 | B2 * | 1/2018 | Sarrazin | G06Q 10/1095 |
| 2004/0019542 | A1 * | 1/2004 | Fuchs | G07C 1/14 |
| | | | | 705/32 |
| 2005/0021429 | A1 * | 1/2005 | Bates | G06Q 10/109 |
| | | | | 705/32 |
| 2005/0049903 | A1 * | 3/2005 | Raja | G06Q 40/02 |
| | | | | 705/32 |

(Continued)

Primary Examiner — Kieu D Vu
Assistant Examiner — Blaine T Basom
(74) Attorney, Agent, or Firm — Patterson & Sheridan, LLP

(57) ABSTRACT

Aspects of the present disclosure provide techniques for providing a graphical user interface. Embodiments include displaying text input fields corresponding to days of a week. Embodiments include receiving a selection of a first text input field of the text input fields corresponding to a day of the week. Embodiments include displaying, based on the selection of the first text input field, an additional text input field for entering text related to the day of the week. Embodiments include receiving a selection of a second text input field of the text input fields corresponding to another day of the week. Embodiments include displaying, based on the selection of the second text input field, an additional text input field for entering text related to the other day of the week in place of the additional text input field related to the day of the week.

20 Claims, 6 Drawing Sheets

(56) References Cited

U.S. PATENT DOCUMENTS

| | | | |
|---|---|---|---|
| 2007/0100714 A1* | 5/2007 | Walker | G06Q 10/1091 |
| | | | 705/32 |
| 2007/0106567 A1* | 5/2007 | Harvey | G06Q 10/06 |
| | | | 705/26.1 |
| 2008/0082925 A1* | 4/2008 | Brush | G06Q 10/1093 |
| | | | 715/744 |
| 2009/0313299 A1* | 12/2009 | Bon | G06F 3/0481 |
| 2011/0239146 A1* | 9/2011 | Dutta | G06Q 10/109 |
| | | | 715/768 |
| 2017/0200129 A1* | 7/2017 | Garg | H04L 51/046 |
| 2017/0213191 A1* | 7/2017 | Pitcher | G16H 40/20 |
| 2017/0243170 A1* | 8/2017 | Rashid | H04W 4/021 |
| 2020/0175479 A1* | 6/2020 | Kozlovski | G06F 3/0482 |

\* cited by examiner

USER INTERFACE FOR TIME ENTRY

INTRODUCTION

Aspects of the present disclosure relate to a user interface for time entry, such as for a timekeeping software application.

BACKGROUND

Software applications have improved time tracking for employees of many organizations. Some time tracking applications allow employees to record time spent on different projects throughout a given time period. Employees may enter their time themselves or a given professional may record multiple employees' time entries through interaction with an application. In some cases, employees may manually track their time, such as using paper time cards, and a professional may enter the manually recorded time of employees into a time tracking application.

As time tracking through software applications becomes more ubiquitous, there is a need for improved user interfaces that allow time to be entered more efficiently, especially when entering time for multiple employees. Furthermore, as mobile devices become more prevalent, there is need for user interfaces that better utilize limited screen space for time entry.

BRIEF SUMMARY

Certain embodiments provide a method for providing a graphical user interface for a computing application. The method generally includes: displaying text input fields corresponding to days of a week; receiving a selection of a first text input field of the text input fields corresponding to a day of the week; displaying, based on the selection of the first text input field, an additional text input field for entering text related to the day of the week; receiving a selection of a second text input field of the text input fields corresponding to another day of the week; and displaying, based on the selection of the second text input field, an additional text input field for entering text related to the other day of the week in place of the additional text input field related to the day of the week.

Other embodiments provide a method for providing a graphical user interface for a computing application. The method generally includes: displaying controls for selecting weeks of a month, each of the controls indicating a total number of hours for one of the weeks; receiving a selection of one of the controls that corresponds to a week of the weeks; displaying text input fields corresponding to days of the week; receiving a selection of a first text input field of the text input fields corresponding to a day of the week; displaying, based on the selection of the first text input field, an additional text input field for entering text related to the day of the week; receiving a selection of a second text input field of the text input fields corresponding to another day of the week; and displaying, based on the selection of the second text input field, an additional text input field for entering text related to the other day of the week in place of the additional text input field related to the day of the week.

Other embodiments provide a system, comprising: one or more processors; and a non-transitory computer readable medium comprising instructions that, when executed by the one or more processors, cause the system to perform a method for providing a graphical user interface for a computing application. The method generally includes: displaying text input fields corresponding to days of a week; receiving a selection of a first text input field of the text input fields corresponding to a day of the week; displaying, based on the selection of the first text input field, an additional text input field for entering text related to the day of the week; receiving a selection of a second text input field of the text input fields corresponding to another day of the week; and displaying, based on the selection of the second text input field, an additional text input field for entering text related to the other day of the week in place of the additional text input field related to the day of the week.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
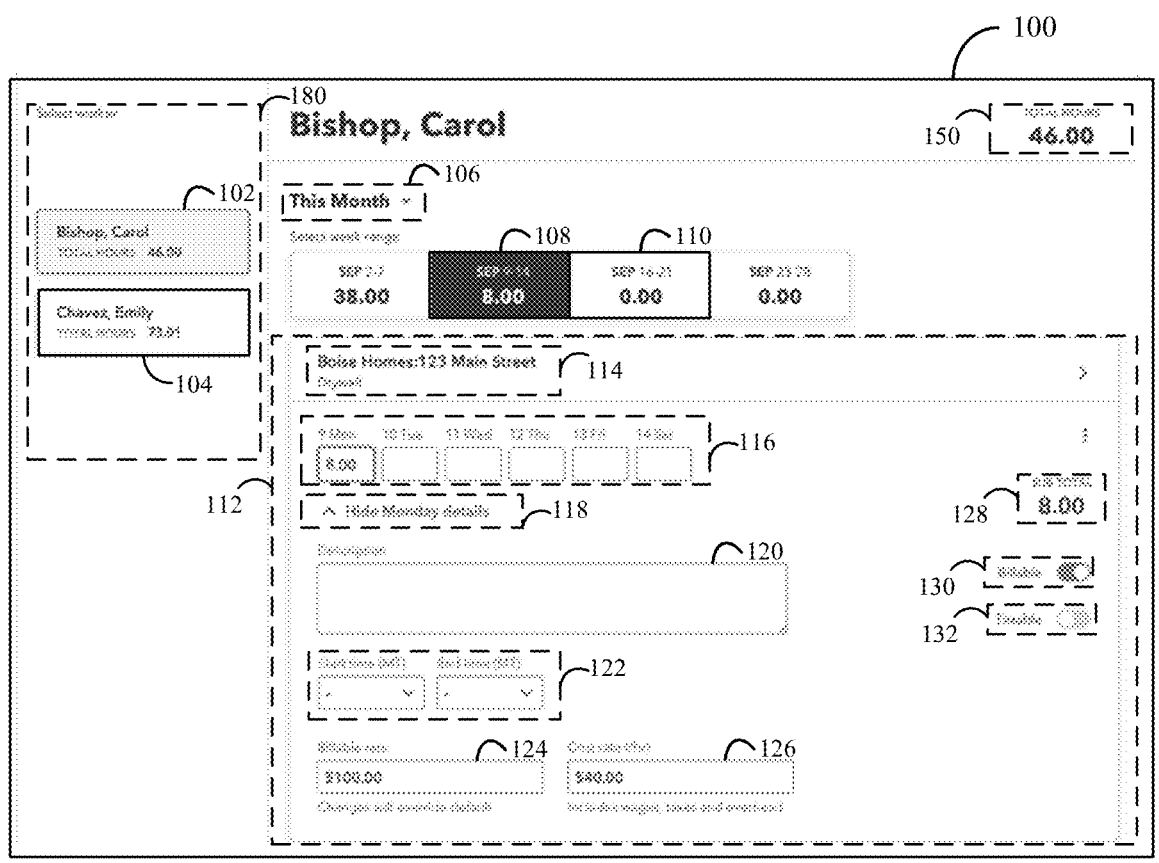
FIG. 1 depicts an example screen of a graphical user interface for time entry.

Aspects of the present disclosure provide apparatuses, methods, processing systems, and computer readable mediums for providing a user interface for time entry.

A software application may allow users to record time spent on tasks. For example, employees of an organization may keep track of time spent on particular projects, and this time may be entered via a graphical user interface associated with an application. The time may be entered directly by an employee or, alternatively, by another professional, such as an administrator who records time for multiple employees. Embodiments of the graphical user interfaces described herein may be implemented on various types of processing systems, such as computers, tablets, mobile devices, and others.

Techniques described herein provide efficient and user-friendly interfaces for entering time, in which the use of screen space is optimized for entry of a single employee's time as well as for entry of multiple employees' time. Certain embodiments provide efficient user interface controls for entering details related to time entries, such as descriptions, start times and end times, whether time is billable or taxable, billable rates, cost rates, and the like.

In certain embodiments, time for a given employee is entered in panels associated with different projects on a weekly basis, and controls allow for easy toggling between weeks in a given month. Within a panel for a particular project, text entry fields for each day of a week allow for time to be entered for each day, while toggling between days for entering additional information related to time for each day by selecting the different text entry fields for different days. When a text entry field for a day is selected, additional controls are displayed within the panel for entering information related to the time entry for the day.

In certain embodiments, projects can be added by selecting a control to add new weekly work details. In some embodiments, projects are recommended based on most recently used projects for a given employee. Once a project is added for a week, a panel for entering time for the project is added within the screen.

In certain embodiments, a side panel displays monthly hour totals for multiple employees in controls associated with each employee. Selecting a control for a given employee causes time entry fields for the given employee to be displayed in the screen. In some embodiments, controls allow for easy toggling between employees, such as sequentially moving to a next employee in a list.

User interfaces described herein improve upon existing user interfaces in a number of ways. For example, while some existing user interfaces for time entry may simultaneously display separate text input fields for entering descriptions of time entries for multiple days, embodiments of the present disclosure display only one text input field for entering a description of a time entry, and the text input field is associated with a particular day depending on which day is currently selected. As such, screen space is utilized more efficiently. Furthermore, providing a control for showing or hiding details of a given day allows for a further more efficient utilization of screen space, as a user may only want to enter a numerical value for a day rather than providing details such as a description and start and end time, and displaying these entry fields may unnecessarily clutter the screen. Providing controls for easy toggling between weeks and months, while displaying current total numbers of hours for the time periods in the controls, allows a user to conveniently navigate through the time entry system while keeping track of time periods for which the user has already entered time.

Allowing for easy toggling between employees, while displaying hourly totals for multiple employees in a side bar, improves upon existing user interfaces that do not include these features by providing a user with high-level information and ease of use. For example, seeing the total number of hours of a given employee in a side bar may allow a user to determine whether time has already been entered for the given employee without viewing the time entry page for the given employee. The user may then toggle to a certain employee for whom time has not been entered (e.g., with 0 total hours shown in the side bar), and enter time details for that employee.

Example User Interface for Time Entry

FIG. 1 illustrates an example screen 100 of a user interface for time entry within a computing application. In an example, screen 100 is displayed in response to user input requesting to enter time for one or more employees.

Screen 100 includes a side panel 180 for selecting an employee. An employee may alternatively be referred to as a worker, user, person, or the like. Side panel 180 includes control 102 for selecting an employee named Carol Bishop, and control 102 indicates that Carol Bishop has a total of 46.00 hours entered for the current month. Side panel 180 further includes control 104 for selecting an employee named Emily Chavez, and control 104 indicates that Emily Chavez has a total of 73.01 hours entered for the current month.

Selecting control 102 causes time entry fields and details to be displayed for Carol Bishop within screen 100. At 150, Carol Bishop's total hours of 46.00 are displayed. Control 106 indicates that the current month is currently selected. When control 106 is selected, a user is enabled to select a different month.

For the currently selected month, controls allow a user to select different weeks. For example, control 108 allows for the selection of the week including Sep. 9-14 and control 110 allows for the selection of the week including Sep. 16-21. It is noted that weeks are only included as an example, and different date ranges may also be indicated by the controls. Furthermore, while controls 108 and 110 only list dates from Monday-Saturday (e.g., because employees may not work on Sunday in some organizations), alternative embodiments include Sunday in each week.

The controls for selecting weeks also indicate total numbers of hours for the weeks. For example, control 108 indicates that Carol Bishop has 8.00 hours entered for the week including Sep. 9-14 and control 110 indicates that Carol Bishop has 0 hours entered for the week including Sep. 16-21.

Control 108 is selected, and panel 112 is displayed for entry of time for Carol Bishop for the week including Sep. 9-14, particularly for the project "Boise Homes: 123 Main Street," and the task "drywall", as indicated in control 114. In one example, selecting control 114 allows the project for panel 112 to be changed.

Text input fields 116 allow entry of time for different days of the week. A text input field 116 for Monday Sep. 9 is selected, and a value of 8 hours is entered. Because the text input field 116 for Monday is selected, control 118 allows for toggling between showing or hiding "Monday details." When Monday details are shown, additional controls are displayed for entering additional details for Monday. The additional controls include text input field 120 for adding a description of the time entry for Monday, controls 122 for entering a start time and end time for the time entry for Monday, and text input fields 124 and 126 for entering a billable rate and a cost rate for the time entry for Monday. The additional controls further include sub-total 128, which shows a sub-total of hours for Monday, toggle 130 for toggling whether the time entry for Monday is billable, and toggle 132 for toggling whether the time entry for Monday is taxable. When the Monday details are hidden using control 114, the additional controls are hidden. In some embodiments, as described below with respect to FIGS. 2 and 3, additional panels for additional projects and adding new projects may be displayed below panel 112.

When a different week is selected, such as by selecting control 110, panels for the different week are shown. For example, if control 110 is selected, panels for the week including Sep. 16-21 may be shown in place of panel 112 (and in place of any additional panels that are displayed below panel 112).

Screen 100 improves upon existing user interface screens, such as those in which time entry fields and controls for multiple days, weeks, and/or months are displayed simultaneously, by reducing clutter and allowing the user to focus on the entry fields and controls for one time period at a time, while allowing for convenient toggling between different time periods. For example, depending on which text input field 116 is selected, the user can focus on entry of time details for a given day, and can switch between days easily by selecting different text input fields 116. As the user adds time entries for different days of a week, a running total of hours for the week is displayed in a control for the week (e.g., controls 108 and 110), allowing the user to keep track of the progress of time entries for different weeks without having to view each week's details to see the total. Furthermore, controls 102 and 104 allow for convenient toggling between different employees while maintaining an awareness of a total number of hours entered for each employee. As such, screen 100 allows a user to conveniently navigate through different time periods for different employees while keeping track of time entry progress for multiple users and time periods at a high level regardless of which page is currently displayed.

Figure 2:
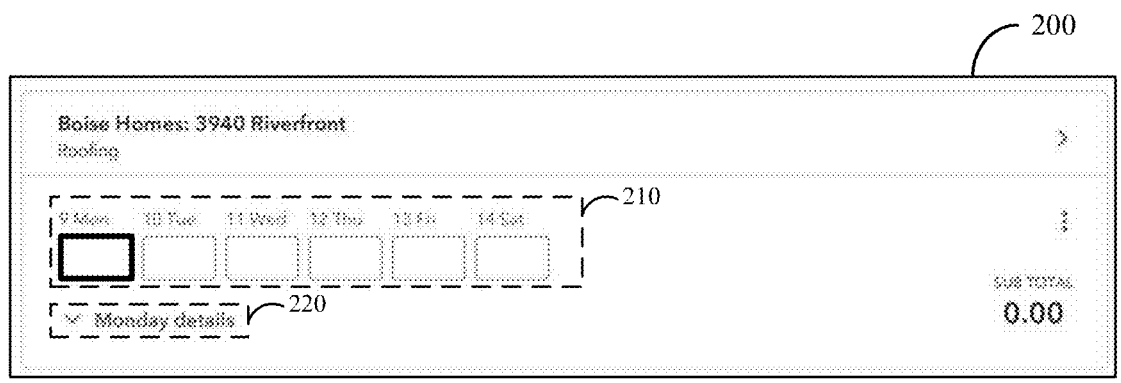
FIG. 2 depicts additional aspects of an example graphical user interface for time entry.

FIG. 2 illustrates additional aspects of the user interface for time entry. In this example, panel 200 represents weekly time entry controls for a different project and task than those depicted in panel 112 of FIG. 1, and may be displayed below panel 112 of FIG. 1. In particular, panel 200 represents weekly time entry controls for Carol Bishop for the week including Sep. 9-14 relating to the project "Boise Homes: 3940 Riverfront" and the task "roofing".

The text input field 210 for Monday Sep. 9 is selected (e.g., which may be represented by a bolder outline for the field or a different color), and control 220 allows for toggling between showing and hiding Monday details. In FIG. 2, Monday details are hidden. Selecting control 220 would cause the Monday details to be displayed. The Monday details may, for example, include additional controls similar to those shown in panel 112 of FIG. 1. If the text input field 210 for Tuesday Sep. 10 were selected, then control 220 would read "Tuesday details" instead of "Monday details".

Hiding details for a day allows a user to efficiently enter numerical values for days without cluttering the screen with additional entry fields and controls if the user is not entering additional details about time entries beyond the number of hours worked. Providing a control for showing or hiding the details allows the user to easily access additional entry fields and controls if needed, while hiding them otherwise for a more streamlined user interface.

Figure 3:
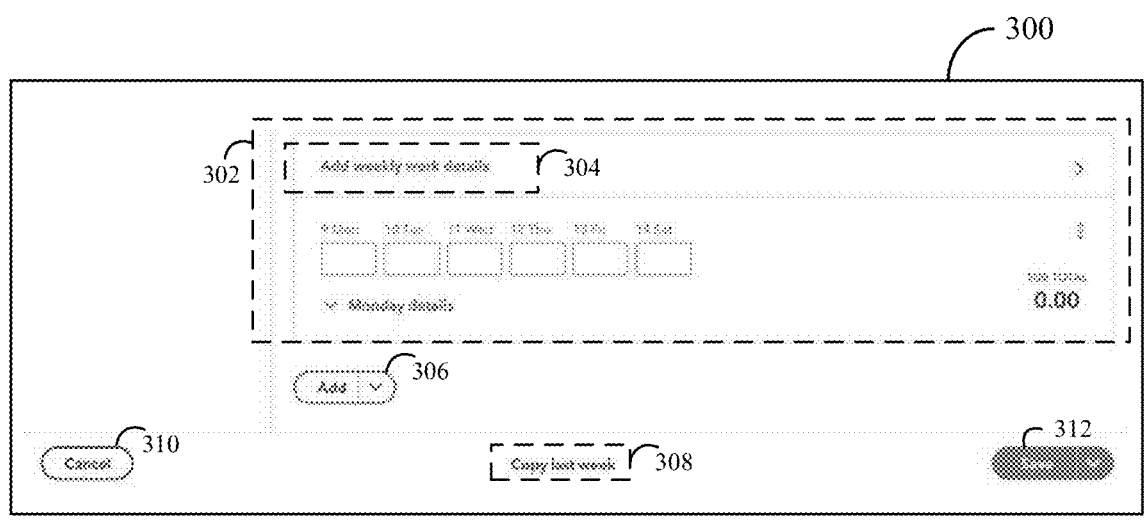
FIG. 3 depicts additional aspects of an example graphical user interface for time entry.

FIG. 3 illustrates additional aspects 300 of the user interface for time entry. In some embodiments, aspects 300 are displayed below panel 112 of FIG. 1 and, in some embodiments, below panel 200 of FIG. 2.

Panel 302 represents additional weekly time entry controls for Carol Bishop for the week including Sep. 9-14 relating to a project that has yet to be specified. Selecting control 304 allows a project and/or task to be selected, as described in more detail below with respect to FIG. 4. Control 306 allows for additional panels to be added, such as to add weekly time for additional projects. Control 308, which reads "copy last week," allows weekly time entries from the previous week to be copied to the current week. For example, selecting control 308 may cause all time entries for all projects during the week including Sep. 2-7 to be copied to the week including Sep. 9-14 for Carol Bishop. This may be a convenient feature for employees who tend to repeat the same work each week.

Control 310 cancels any changes to the time entries for Carol Bishop made during the present session, such as all changes made on the currently displayed screen. Control 312 saves all changes made for Carol Bishop during the current session. In some embodiments, when control 312 is selected, additional options are displayed, including "save and go to next". Choosing the "save and go to next" option saves all changes made during the current session for Carol Bishop and proceeds to the next employee in a list of employees, such as Emily Chavez from control 104 of FIG. 1.

Aspects 300 provide many benefits, such as the ability to conveniently add new projects for weekly time entries while allowing time to be recorded before the project is identified. Separating projects into different panels allows for convenient separation of time spent on each project, with a sub-total of hours for each project displayed in the panel for the project. Providing a control for copying time entries from a previous week allows users to conveniently duplicate time entries across weeks, such as for cases where employees tend to repeat the same work across different weeks. Furthermore, providing a control for saving changes and proceeding to a next employee allows for convenient sequential time entry for multiple employees.

Figure 4:
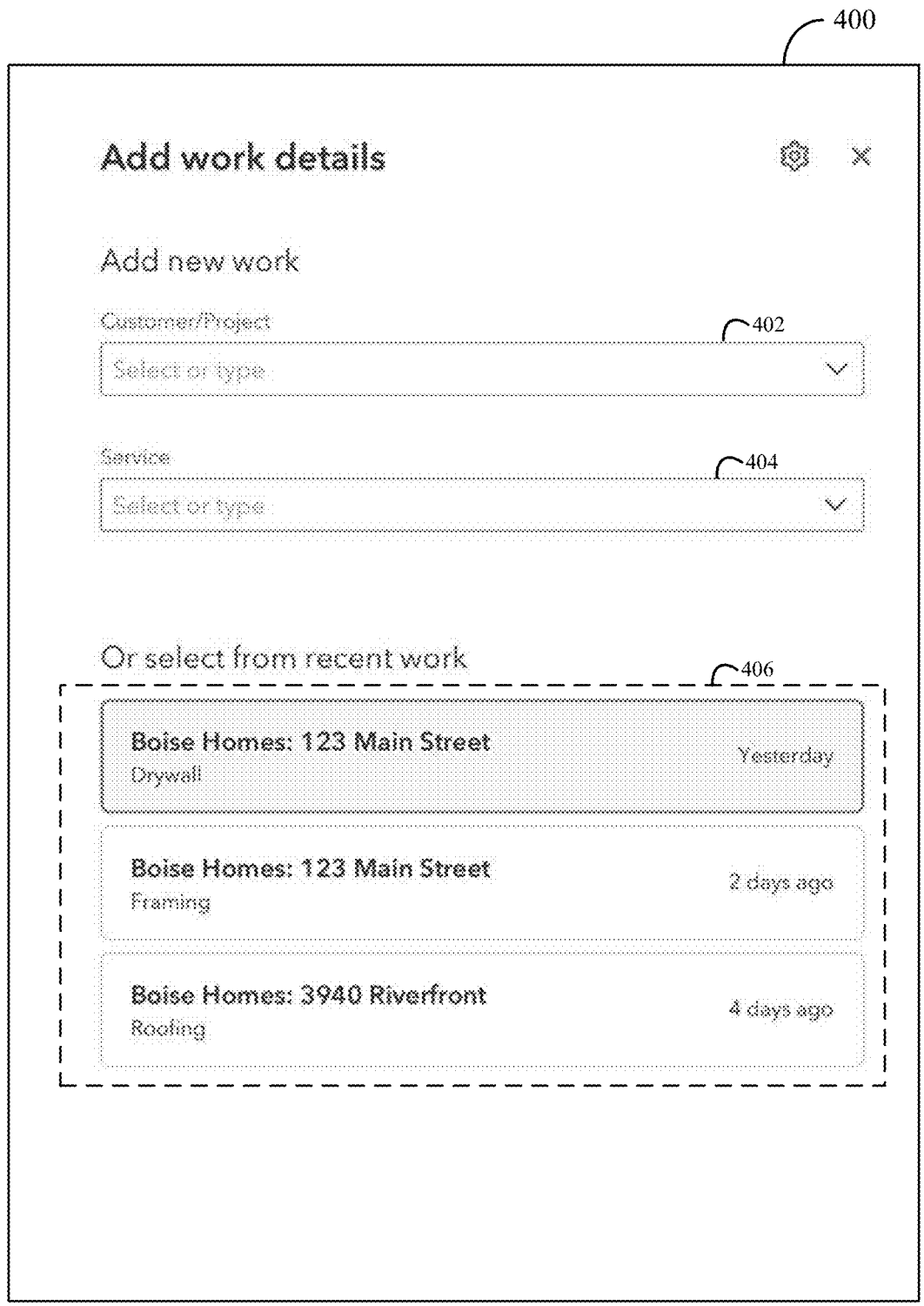
FIG. 4 depicts additional aspects of an example graphical user interface for time entry.

FIG. 4 illustrates additional aspects of the graphical user interface for time entry. Panel 400 may, for example, be displayed when control 304 of FIG. 3 is selected, such as adjacent to or overlaying aspects of the graphical user interface shown in FIGS. 1-3. Panel 400 allows work details to be added for a given set of weekly time entries for a given employee.

Control 402 allows a project or customer to be specified, such as by selecting from a drop-down list of previously-entered projects and/or customers or by entering text to identify a new project and/or customer.

Control 404 allows a task or service to be specified, such as by selecting from a drop-down list of previously-entered tasks or services or by entering text to identify a new task or service.

Furthermore, recommendations 406 are provided within panel 400. Recommendations 406 include projects, customers, and/or tasks or services that the employee has previously entered time for. In one example, recommendations 406 include the most recent projects, customers, tasks, and/or services from the employee's time entries. For example, the most recent two or three combinations of customer, project, and task may be displayed as recommendations. Other numbers of recommendations may also be displayed. In this case, Carol Bishop's most recent three combinations of customer, project, and task were "Boise Homes: 123 Main Street" and "Drywall", "Boise Homes: 123 Main Street" and "Framing", and "Boise Homes: 3940 Riverfront" and "Roofing". As such, these three combinations are included in recommendations 406. Selecting one of recommendations 406 applies the selected combination of customer, project, and task to the weekly entries shown in panel 302 of FIG. 3.

Recommending customers, projects, and tasks for an employee based on recent time entries allows for more convenient time entry, particularly when employees tend to spend time on the same customers, projects, and tasks from week to week.

It is noted that certain elements of the graphical user interface shown in FIGS. 1-4 are included as examples, and variations are possible. For example different shapes, colors, orderings, and arrangements of various elements of the example user interfaces are possible without departing from the scope of the present disclosure.

Example Operations for Providing a Graphical User Interface for Time Entry

Figure 5:
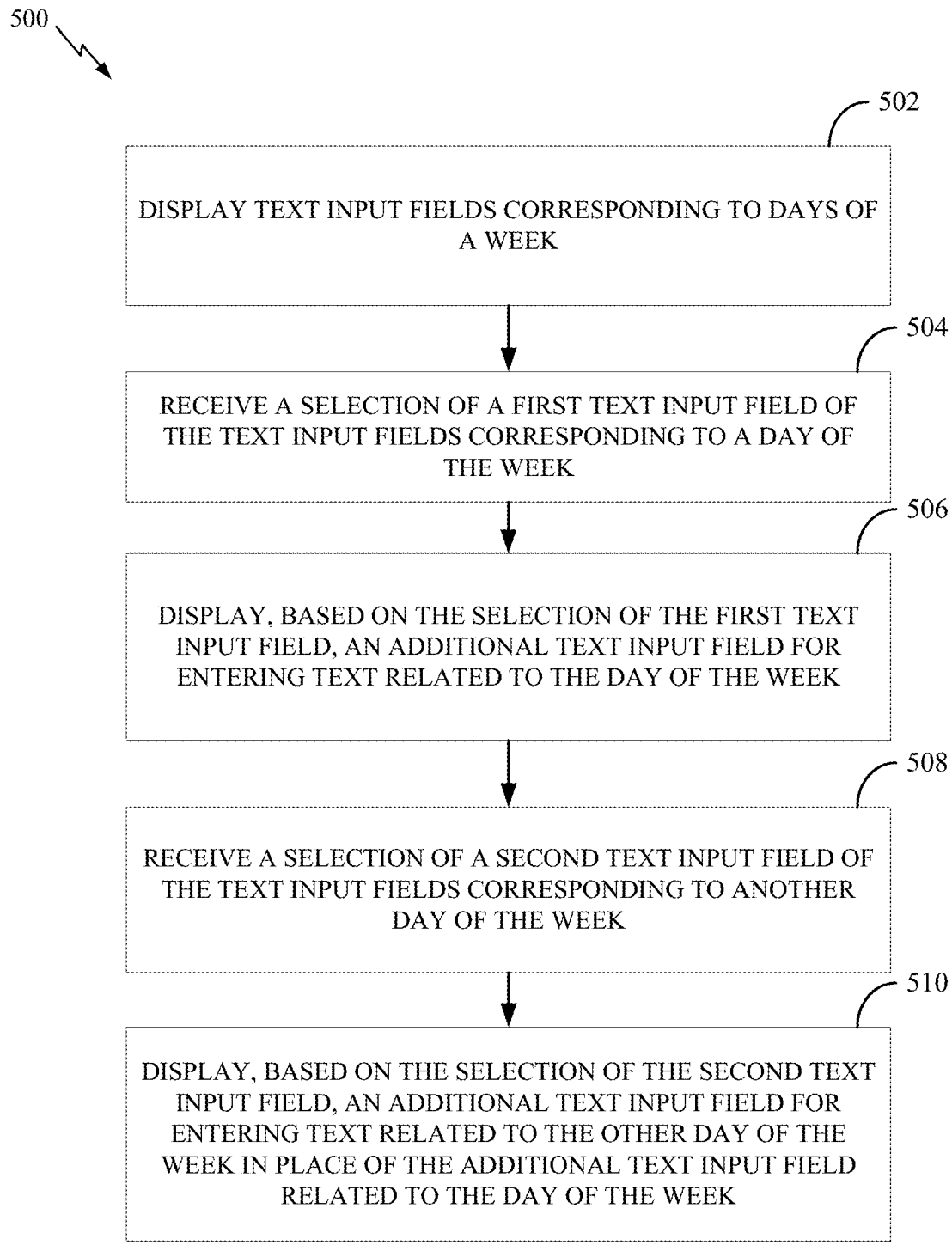
FIG. 5 depicts example operations for providing a graphical user interface for time entry.

FIG. 5 depicts example operations 500 for providing a graphical user interface for time entry. For example, operations 500 may be performed by system 600 of FIG. 6, as described below.

At step 502, text input fields corresponding to days of a week are displayed.

For example, text input fields 116 may be displayed within screen 100 of FIG. 1. The week may have been selected from different weeks of the month by selecting one of a plurality of controls for different weeks. Each control for a week may display the total number of hours for the week. The controls for the weeks and/or the text input fields corresponding to the days of the week are associated with a particular employee. Projects may be separated into different panels for the week, and controls may be displayed that allow for adding new projects for the week when selected. When a user adds a new project for a week, recommendations or projects may be displayed for selection, such as based on most recent projects in the employee's time entry history.

In some embodiments, the graphical user interface allows time to be entered for multiple employees. Controls for the multiple employees may be displayed in a side panel that is proximate to a panel in which the text input fields corresponding to the days of the week are displayed. Each control for an employee may list the employee's name and, in some embodiments, a total number of hours for the employee. Selecting a control for a different employee causes the text input fields and/or controls to be replaced with alternate text input fields and/or controls related to the different employee.

At step 504, a selection is received of a first text input field of the text input fields corresponding to a day of the week. For example, one of text input fields 116 of FIG. 1 corresponding to Monday may be selected.

At step 506, based on the first selection, an additional text input field for entering text related to the day of the week is displayed. For example, text input field 120 of FIG. 1 may be displayed for entering a description of a time entry for Monday. The first additional text input field may be displayed in further response to an additional selection of a control for expanding details related to the first day. One or more controls for entering a start time and an end time for the first day may also be displayed, as well as additional controls such as toggles for indicating whether a time entry is billable or taxable and text input fields for entering a billable rate or cost rate related to the first day.

At step 508, a selection of a second text input field of the text input fields corresponding to another day of the week is received. For example, a different one of text input fields 116 of FIG. 1 corresponding to Tuesday may be selected.

At step 510, based on the second selection, an additional text input field for entering text related to the other day of the week is displayed in place of the additional text input field for entering text related to the day of the week. For example, a text input field for entering a description of a time entry for Tuesday may be displayed in place of text input field 120 of FIG. 1.

Operations 500 provide many benefits, such as limiting the entry fields and controls displayed within a screen based on the employee, month, project, week, and/or day that the user has currently selected. By limiting the entry fields and controls displayed to those relevant to a particular stage of the time entry process, embodiments of the present disclosure reduce screen clutter, allowing a user to focus on most relevant aspects of the user interface. Displaying hour totals in various controls allows a user to keep track of time entry progress across multiple projects, multiple weeks, and even multiple employees without navigating to different pages. Various entry fields, controls, and toggles described in operations 500 allow for convenient navigation between different time periods, projects, and employees without excessively utilizing the limited amount of screen space available on devices.

Figure 6:
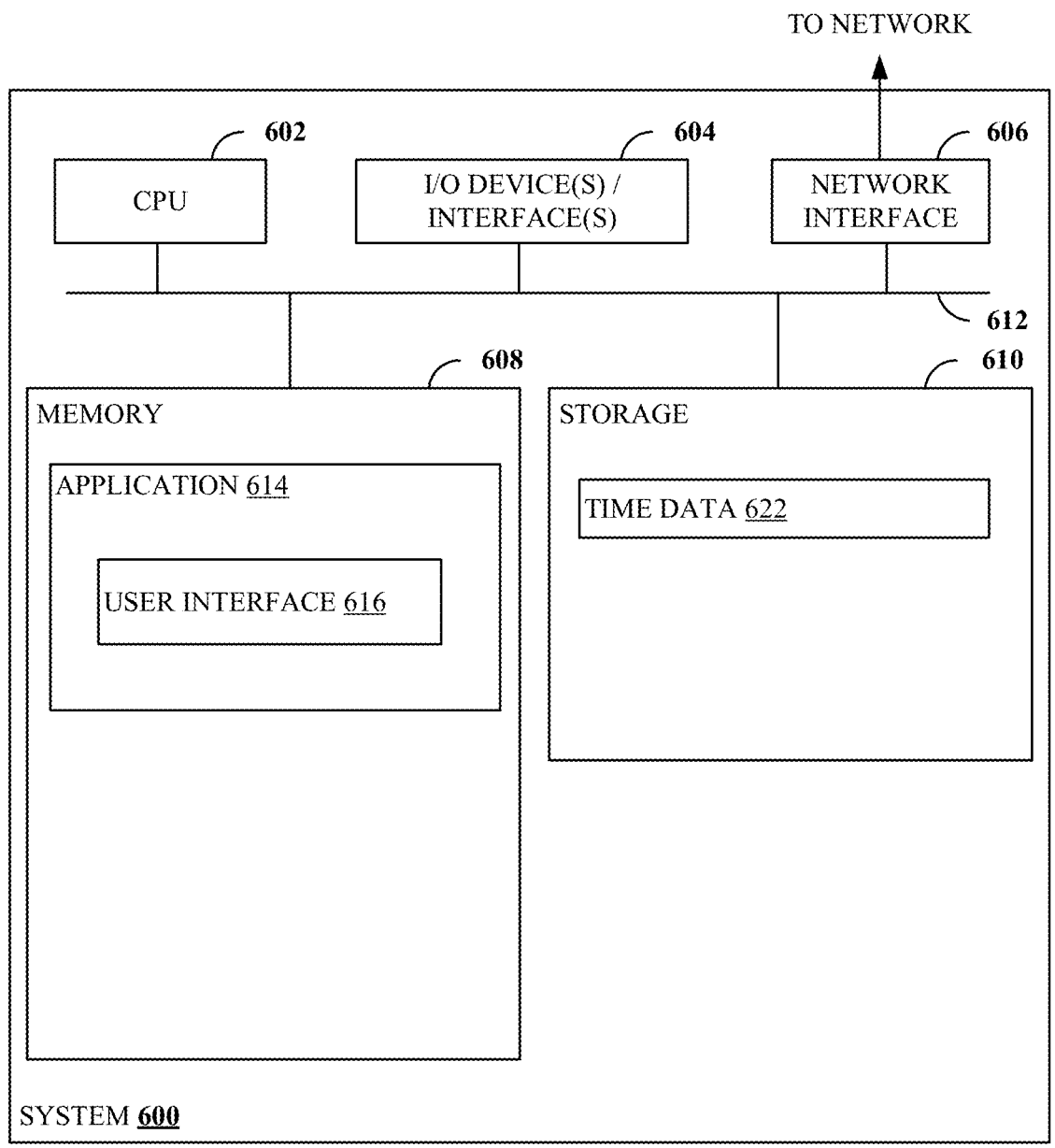
FIG. 6 depicts an example processing system for providing a user interface for time entry.

Example Computing System for Providing a Graphical User Interface for Time Entry FIG. 6 illustrates an example system 600 with which embodiments of the present disclosure may be implemented. For example, system 600 may be used to provide aspects of the graphical user interface illustrated in FIGS. 1-4, and may perform operations 500 of FIG. 5.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes application 614, with which a user interacts via user interface 616. In one example, application 614 is a time tracking application that allows users to record time for employees of an organization. User interface 616 generally represents a graphical user interface provided by application 614. For example, user interface 616 may include aspects of the user interface depicted in FIGS. 1-4. In some embodiments, a user may interact with user interface 616 over a network, such as from a separate client device.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises time data 622, which generally represents information related to time entries for employees. For example, time data 622 may include employee details, project, customer, and task details, time entries, and the like.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing a graphical user interface for time entries, the method comprising:
   displaying text input fields corresponding to days of a week, wherein each text input field of the text input fields comprises a control configured to receive a numerical time value for a given day of the days of the week and is displayed adjacent to a corresponding text string indicating the given day;
   receiving a selection of a first text input field of the text input fields corresponding to a day of the week;
   displaying, based on the selection of the first text input field, an additional text input field for entering text related to the day of the week that describes a first numerical time value entered in the first text input field;
   receiving a selection of a second text input field of the text input fields corresponding to another day of the week; and
   displaying, based on the selection of the second text input field, an additional text input field for entering text related to the other day of the week that describes a second numerical time value entered in the second text input field in place of the additional text input field related to the day of the week.

2. The method of claim 1, further comprising:
   displaying, based on the selection of the first text input field, one or more controls for entering a start time and an end time for the day; and
   displaying, based on the selection of the second text input field, one or more controls for entering a start time and an end time for the other day in place of the one or more controls for entering the start time and the end time for the day.

3. The method of claim 1, further comprising:
   displaying a control for adding a new project for the week;
   receiving a selection of the control; and
   displaying, in response to the selection of the control, a recommended project to add for the week.

4. The method of claim 3, wherein the recommended project is determined based on recent time entries of an employee.

5. The method of claim 1, wherein the text input fields are displayed within a first panel, and wherein the method further comprises displaying a second panel that is proximate to the first panel, the second panel comprising:
   a total number of hours for a first employee; and
   a total number of hours for a second employee.

6. The method of claim 5, wherein the text input fields are associated with the first employee, and wherein the method further comprises:
   receiving a selection of a control associated with the second employee in the second panel; and
   displaying, in response to the selection of the control associated with the second employee, in place of the text input fields, alternative text input fields corresponding to the days of the week, wherein the alternative text input fields are associated with the second employee.

7. The method of claim 1, wherein the additional text input field for entering text related to the day of the week is displayed in further response to an additional selection of a control for expanding details related to the day of the week.

8. The method of claim 1, further comprising:
   displaying, based on the selection of the first text input field, a toggle for indicating whether a time entry for the day of the week is billable; and
   displaying, based on the selection of the second text input field, a toggle for indicating whether a time entry for the other day of the week is billable in place of the toggle for indicating whether the time entry for the day of the week is billable.

9. The method of claim 1, further comprising:
   displaying, based on the selection of the first text input field, a toggle for indicating whether a time entry for the day of the week is taxable; and
   displaying, based on the selection of the second text input field, a toggle for indicating whether a time entry for the other day of the week is taxable in place of the toggle for indicating whether the time entry for the day of the week is taxable.

10. The method of claim 1, further comprising:
    displaying, based on the selection of the first text input field, an additional text input field for providing a billable rate related to the day of the week; and
    displaying, based on the selection of the second text input field, an additional text input field for providing a billable rate related to the other day of the week in place of the additional text input field for providing the billable rate related to the day of the week.

11. The method of claim 1, further comprising:
    displaying, based on the selection of the first text input field, an additional text input field for providing a cost rate related to the day of the week; and
    displaying, based on the selection of the second text input field, an additional text input field for providing a cost rate related to the other day of the week in place of the additional text input field for providing the cost rate related to the day of the week.

12. A system, comprising a processor and a memory comprising instructions that, when executed by the processor, cause the system to perform a method for providing a graphical user interface for time entries, the method comprising:
   displaying text input fields corresponding to days of a week, wherein each text input field of the text input fields comprises a control configured to receive a numerical time value for a given day of the days of the week and is displayed adjacent to a corresponding text string indicating the given day;
   receiving a selection of a first text input field of the text input fields corresponding to a day of the week;
   displaying, based on the selection of the first text input field, an additional text input field for entering text related to the day of the week that describes a first numerical time value entered in the first text input field;
   receiving a selection of a second text input field of the text input fields corresponding to another day of the week; and
   displaying, based on the selection of the second text input field, an additional text input field for entering text related to the other day of the week that describes a second numerical time value entered in the second text input field in place of the additional text input field related to the day of the week.

13. The system of claim 12, wherein the method further comprises:
   displaying, based on the selection of the first text input field, one or more controls for entering a start time and an end time for the day; and
   displaying, based on the selection of the second text input field, one or more controls for entering a start time and an end time for the other day in place of the one or more controls for entering the start time and the end time for the day.

14. The system of claim 12, wherein the method further comprises:
   displaying a control for adding a new project for the week;
   receiving a selection of the control; and
   displaying, in response to the selection of the control, a recommended project to add for the week.

15. The system of claim 14, wherein the recommended project is determined based on recent time entries of an employee.

16. The system of claim 12, wherein the text input fields are displayed within a first panel, and wherein the method further comprises displaying a second panel that is proximate to the first panel, the second panel comprising:
   a total number of hours for a first employee; and
   a total number of hours for a second employee.

17. The system of claim 16, wherein the text input fields are associated with the first employee, and wherein the method further comprises:
   receiving a selection of a control associated with the second employee in the second panel; and
   displaying, in response to the selection of the control associated with the second employee, in place of the text input fields, alternative text input fields corresponding to the days of the week, wherein the alternative text input fields are associated with the second employee.

18. The system of claim 12, wherein the additional text input field for entering text related to the day of the week is displayed in further response to an additional selection of a control for expanding details related to the day of the week.

19. The system of claim 12, wherein the method further comprises:
   displaying, based on the selection of the first text input field, a toggle for indicating whether a time entry for the day of the week is billable; and
   displaying, based on the selection of the second text input field, a toggle for indicating whether a time entry for the other day of the week is billable in place of the toggle for indicating whether the time entry for the day of the week is billable.

20. A method for providing a graphical user interface for time entries, the method comprising:
   displaying controls for selecting weeks of a month, each of the controls indicating a total number of hours for one of the weeks;
   receiving a selection of one of the controls that corresponds to a week of the weeks;
   displaying text input fields corresponding to days of the week, wherein each text input field of the text input fields comprises a control configured to receive a numerical time value for a given day of the days of the week and is displayed adjacent to a corresponding text string indicating the given day;
   receiving a selection of a first text input field of the text input fields corresponding to a day of the week;
   displaying, based on the selection of the first text input field, an additional text input field for entering text related to the day of the week that describes a first numerical time value entered in the first text input field;
   receiving a selection of a second text input field of the text input fields corresponding to another day of the week; and
   displaying, based on the selection of the second text input field, an additional text input field for entering text related to the other day of the week that describes a second numerical time value entered in the second text input field in place of the additional text input field related to the day of the week.

* * * * *